No. 648,944. Patented May 8, 1900.
A. J. GILLESPIE.
VOTING MACHINE.
(Application filed Jan. 3, 1899.)
(No Model.) 11 Sheets—Sheet 1.

Fig. 1.

Witnesses. Inventor.

No. 648,944. Patented May 8, 1900.
A. J. GILLESPIE.
VOTING MACHINE.
(Application filed Jan. 3, 1899.)
(No Model.) 11 Sheets—Sheet 2.

Fig. 2.

Witnesses. Inventor.

No. 648,944. Patented May 8, 1900.
A. J. GILLESPIE.
VOTING MACHINE.
(Application filed Jan. 3, 1899.)
(No Model.) 11 Sheets—Sheet 3.

Witnesses. Inventor.

No. 648,944. Patented May 8, 1900.
A. J. GILLESPIE.
VOTING MACHINE.
(Application filed Jan. 3, 1899.)
(No Model.) 11 Sheets—Sheet 4.

Witnesses. Inventor.

No. 648,944. Patented May 8, 1900.
A. J. GILLESPIE.
VOTING MACHINE.
(Application filed Jan. 3, 1899.)
(No Model.) 11 Sheets—Sheet 5.

No. 648,944. Patented May 8, 1900.
A. J. GILLESPIE.
VOTING MACHINE.
(Application filed Jan. 3, 1899.)
(No Model.) 11 Sheets—Sheet 7.

Witnesses. Inventor.
Alfred J Gillespie
by Church & Church
his Attorneys

THE NORRIS PETERS CO., PHOTO-LITHO., WASHINGTON, D. C.

No. 648,944. Patented May 8, 1900.
A. J. GILLESPIE.
VOTING MACHINE.
(Application filed Jan. 3, 1899.)
(No Model.) 11 Sheets—Sheet 8.

Witnesses. Inventor.
Alfred J. Gillespie
Attorneys

No. 648,944. Patented May 8, 1900.
A. J. GILLESPIE.
VOTING MACHINE.
(Application filed Jan. 3, 1899.)
(No Model.) 11 Sheets—Sheet 9.

Witnesses. Inventor.

UNITED STATES PATENT OFFICE.

ALFRED J. GILLESPIE, OF ROCHESTER, NEW YORK, ASSIGNOR TO THE STANDARD VOTING MACHINE COMPANY, OF SAME PLACE.

VOTING-MACHINE.

SPECIFICATION forming part of Letters Patent No. 648,944, dated May 8, 1900.

Application filed January 3, 1899. Serial No. 700,994. (No model.)

*To all whom it may concern:*

Be it known that I, ALFRED J. GILLESPIE, of Rochester, in the county of Monroe and State of New York, have invented certain new and useful Improvements in Voting-Machines; and I do hereby declare the following to be a full, clear, and exact description of the same, reference being had to the accompanying drawings, forming a part of this specification, and to the reference-numerals marked thereon.

My present invention relates to that class of voting-machines shown in Letters Patent No. 576,570, granted to me the 9th day of February, 1897, and the machine embodies means whereby the voter may select and indicate the ticket he desires to vote, without, however, being able to indicate more than the proper number of votes for the candidates for the same office, and whereby when he leaves the proximity of the voting-machine or removes the barrier or covering-curtain the votes or ballots indicated by him in secret will be cast or counted and the operated devices returned to normal position, ready to be actuated by the next voter in the same manner. The improvements contained in this application not only improve the construction of the machine, but also enable machines of the same general type as that contained in said patent to be adapted for multicandidate or group voting—that is, so as to permit the voter to cast a ballot for any predetermined number of candidates for a particular office whether nominated by the same or different parties; and to these and other ends the invention consists in certain improvements which will be hereinafter fully described, and the novel features pointed out particularly in the claims at the end of this specification.

In the accompanying drawings,
Fig. 4, a vertical sectional view on the line $aa$ of Fig. 3;
Fig. 13, a perspective sectional view showing the construction and arrangement of the indicators, registers, and immediate actuating parts;
Fig. 14, a vertical sectional view taken on the line $hh$ of Fig. 13;
Fig. 15, a horizontal sectional view of one of the registers, taken on the line $jj$ of Fig. 13.

Similar reference-numerals indicate similar parts.

The machine embodies generally a main casing preferably composed of sheet metal and having the top plate 1, the side plates 2 2, and the bottom plate 3, and at the front is provided with a plate or support 4, on which the ballot sheet or sheets 5 are secured in any suitable manner. and at the lower portion a door 6, hinged at 7 to fold upwardly and expose the operating parts below. At the back of the casing are provided doors 8 and 9, hinged upon a suitable support, preferably a horizontally-extending rod 10, as shown particularly in Fig. 4. The doors 6, 8, and 9 are normally closed and conceal the operating parts. The front plate, on which the ballot-sheet is secured, is normally uncovered, excepting for the barrier or curtain 11ª, attached to rings 111, arranged to slide upon the segmental rod 11, arranged at the top of the machine and connected to an operating arm or lever 12, adapted to swing around over the rod or support 11 to draw the curtain over or remove it from the front of the machine, or any other suitable cover or barrier could be employed, if desired, for preventing access to the ballot-plate or a view of the voter and indicators when the latter are being arranged.

Figure 2:
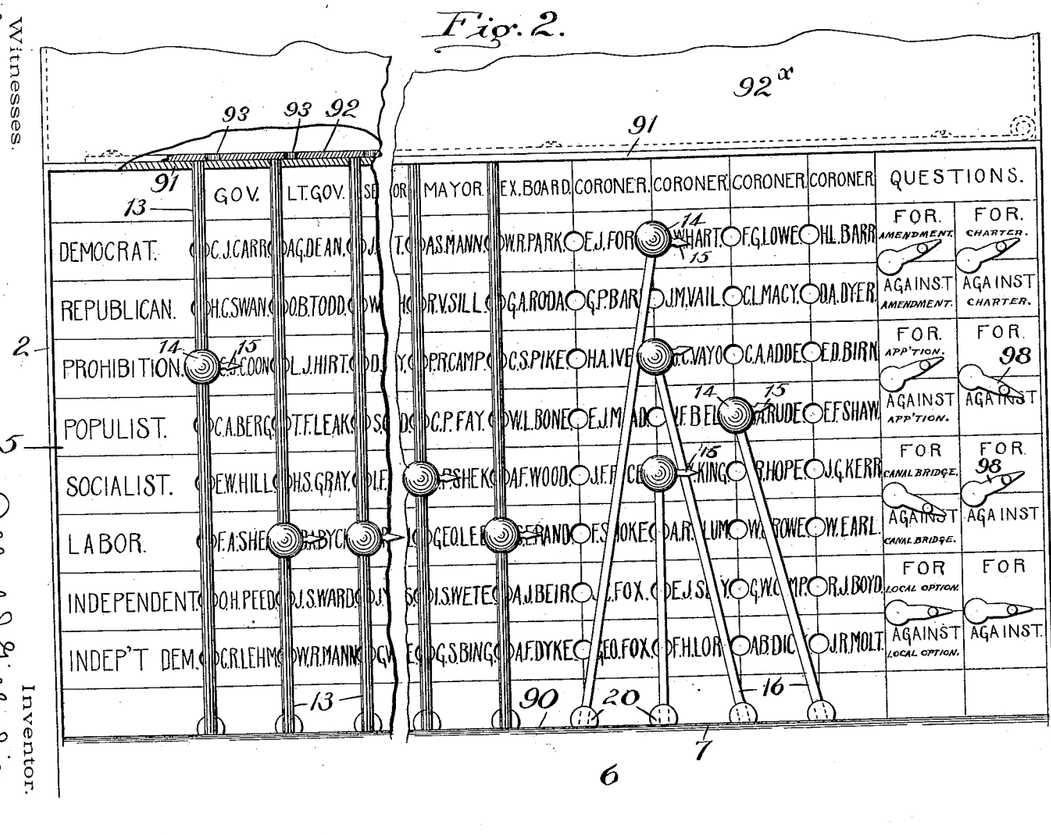
Fig. 2, an enlarged front view of the board or plate containing the tickets or names of the candidates and showing also the indicating devices set to vote a mixed ticket.

The ballot-sheet 5 contains the names of all the candidates or persons nominated by the regular parties, the names of the candidates nominated by each party in this machine being arranged in the same horizontal row and the names of the candidates of the various parties for the same office being arranged in the same vertical lines, as shown particularly in Fig. 2, and at the extreme right-hand end of the ballot-sheet are arranged statements of the questions to be voted for at the election—as, for instance, amendments to the constitution, appropriations, local option, or others.

The ballot-indicators in my present machine embody two connected rods 16 and 18, one, 16, arranged in front of the ballot support or plate 4 and having an operating knob or handle 14, constituting also an index for coöperating with the tickets or names of the candidates on the ballot-sheet, and the other rod, 18, arranged in rear of the plate 4 and having the boss or abutment 19 projecting at a slightly-higher level than the knob 14 in order to better accommodate the parts arranged beneath it. The rods 16 extend through a horizontal plate 17 beneath the ballot-sheet and also through guides formed of slotted pins 20, journaled in the frame and adapted to rotate in their bearings when required, as will be explained. The connection between the lower ends of the rods 16 and 18 is formed by a metal clip or connecting-piece 21, slipped longitudinally over the reduced portions 22 of said rods.

23 indicates a spring, preferably of sheet metal, having a loop engaging the rod 16 and having its end bent down and then returned to bear against the rear of the door or plate 6, which forms a friction-surface offering slight resistance to the movement of the indicators and serving to hold them yieldingly in adjusted position.

Figures 4, 13, 14, 15:
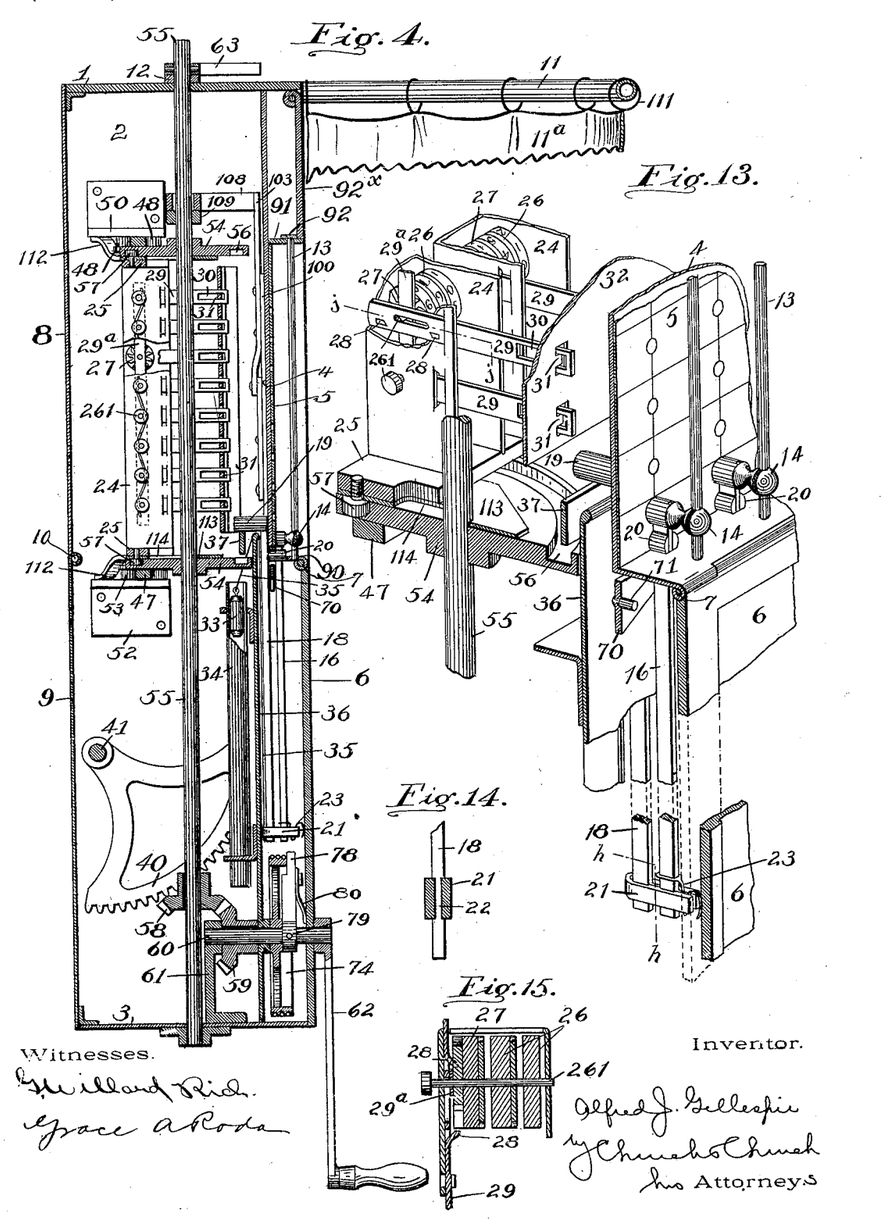

The indexes or handles 14 on the indicators are provided with small pointers 15 at one side to coöperate with the name of the candidate for whom it is desired to cast a vote, so that it will not be necessary to place the handles 14 directly over his ticket, and said handles are also provided with vertical perforations for the reception of vertical guides 13, removably secured to the casing in a manner presently described, so that the indicators will be guided in right lines and coöperate only with the candidates' names which appear in the same vertical column. Thus there is a single indicator for each vertical column, and there are as many columns as there may be offices to be filled, whether one or more candidates are nominated by each party or not. It will be understood that there is a single indicator for each vertical office-row of indicators. The registers or counters with which the knobs or bosses 19 on the rod 18 coöperate are arranged in vertical series, one series for each office-row and each series in a suitable channel-plate 24, secured at opposite ends to a register-frame 25, movable toward and from the front plate of the machine. Said registers each embody a train of numbered wheels 26, loose on arbors 261 in the plates and connected by suitable gearing or connecting means for causing the proper registration, the numbers on the faces of the wheels being visible through suitable apertures in the rear of the channel-plates 24, as shown, the units-wheel 27 of each register being provided with teeth, with which coöperate pallets or teeth 28, formed upon or attached to the counter actuators or slides 29, supported in the channel-plates 24, having the central slots for the passage of the arbors 261 and also having the slots 30 at their forward portion, in which latter extend tongues 31, formed at the side of apertures in a plate 32, secured rigidly to the sides of the casing of the machine. As the register-actuators are reciprocated to operate the registers, and in order to prevent the accidental movement of the units-wheel by the actuator, I provide separating-plates 29ª between the sides of the actuators and wheels, as shown in Fig. 15. One of these registers and its actuator is provided for each candidate whose name appears upon the ballot-sheet and two for each question or amendment, and the forward end of the actuator is arranged in a horizontal plane slightly above that of the ticket or place devoted to the candidate or question on the ballot-sheet. When the indicator-knob 14 is moved so that the pointer thereon comes opposite the name of the candidate on the ballot-sheet, the knob or boss 19 connected with said indicator will be opposite the forward end of the register-actuator devoted to said candidate. When the frame 25, carrying all the registers, is moved toward the front plate, the ends of the register-actuators will engage the bosses 19 of the indicators which have been operated to indicate a vote, holding said actuators stationary while the register-frame moves forward, thus turning the registers one unit and registering one vote for those candidates, and for only those candidates, whose indicators have been operated. As the frame 25 is moved backward again the tongues 31 on the plate 32 engage the forward ends of the slot 30 on the actuators, holding the latter forward in the position shown in Fig. 13, ready for the next operation.

In order that the vertical movements of the indicators 14 may be readily accomplished and to prevent accidental dropping of the same, I provide each of them with a counterweight 33, operating in a tube 34 inside the casing of the machine and connected by a cord or other flexible connection 35 with the lower portion of the rod 18, or preferably with the clip 21 thereon, as shown particularly in Fig. 4, said cord passing over the upper end of the partition-plate 36, arranged behind the door 6, as shown.

To enable a voter to, if so inclined, vote a straight ticket or indicate a ballot for all the candidates of a particular party, (the names of said candidates appearing in the same horizontal line,) I provide a vertically-movable "straight-ticket" bar 37, located beneath the heads 19 on the rods 18, said straight-ticket bar being connected at the ends to rack-bars 38, guided at their upper ends on rods 39, and the teeth at their lower ends meshing with segment-gears 40, arranged on a shaft 41, extending transversely of the casing and having on its outer end a handle 42, readily accessible to the voter and by means of which he can raise the straight-ticket bar and lift all of the bosses or abutments 19 until the indicators are in line with the candidates of the party for whom he desires to vote, where they will be maintained by the counterweights and friction, as described, so that when the registers and indicators are moved relatively toward each other the registers devoted to candidates of that particular party will be operated. The segments and the handle are so disposed upon the shaft 40 that when the handle is dropped the bar will return to its lowermost position, as shown in Figs. 4 and 13.

Figure 3:
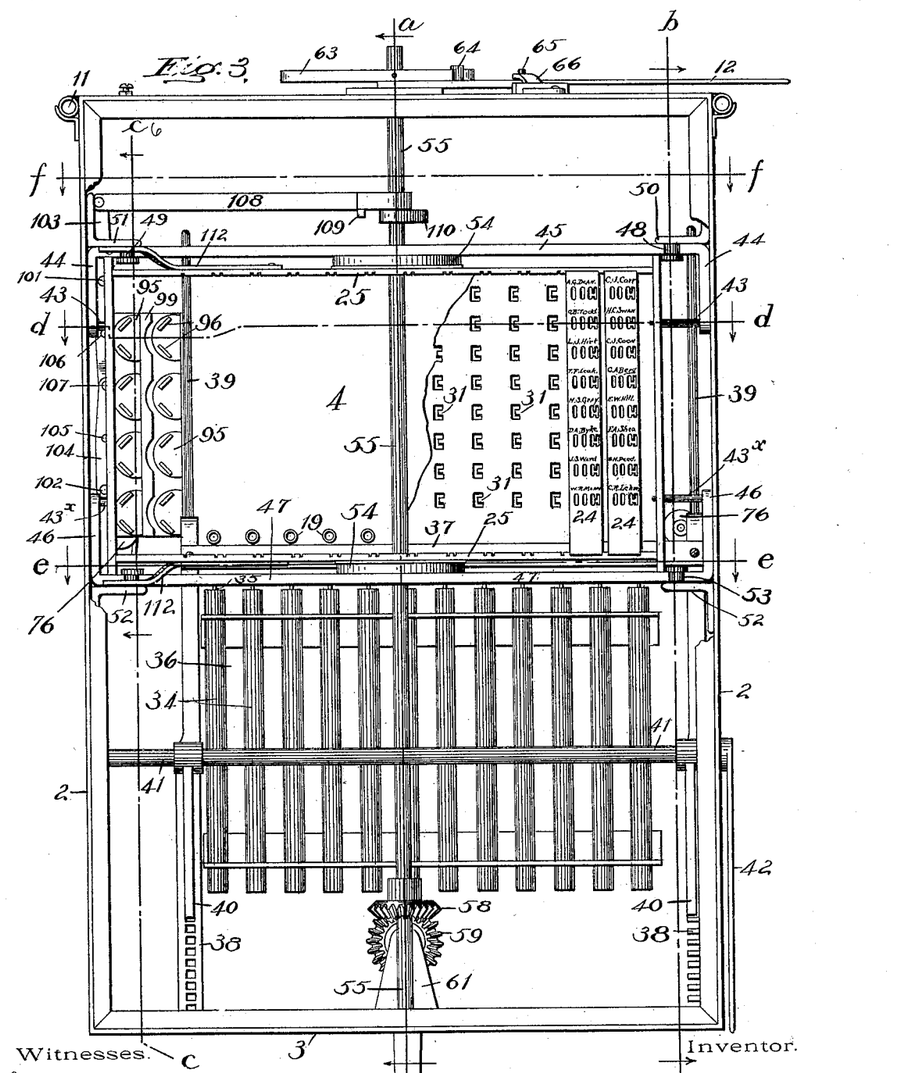
Fig. 3, a rear view of the machine with the rear casing or doors open or removed and portions of the registers and register-casings broken away to show the construction of the parts.
Figure 5:
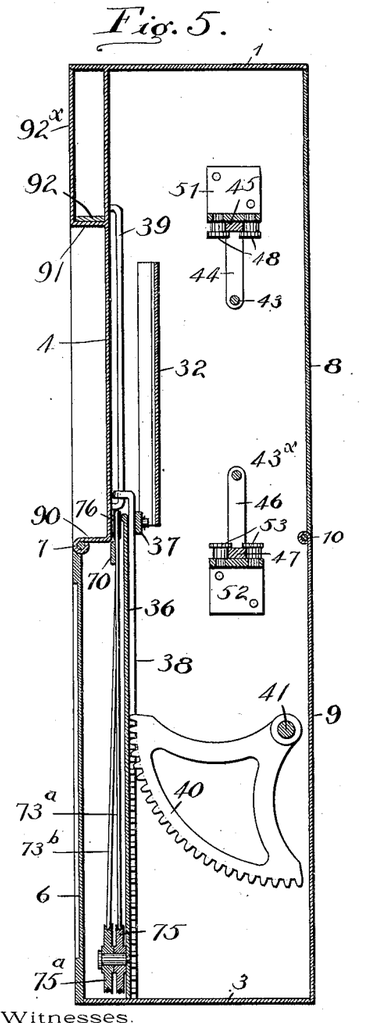
Fig. 5, a vertical sectional view on the line $bb$ of Fig. 3.
Figure 6:
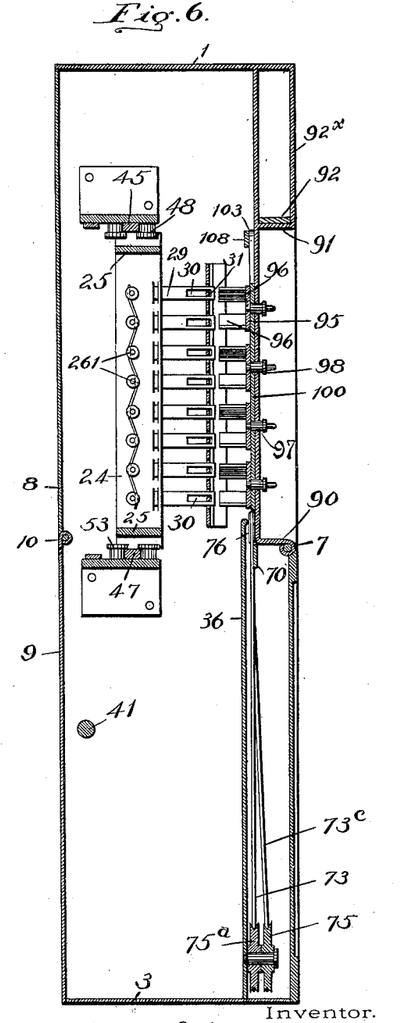
Fig. 6, a similar view on the line $cc$ of Fig. 3.
Figure 7:
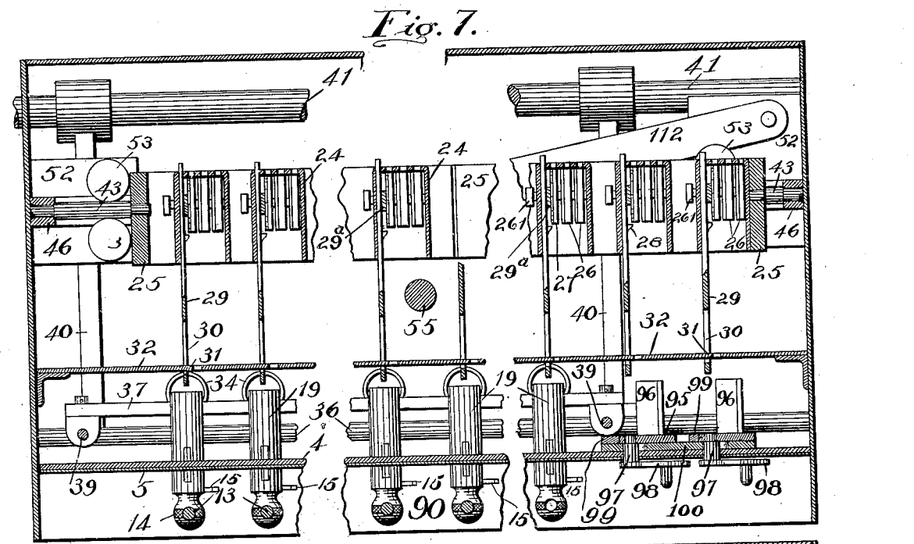
Fig. 7, a horizontal sectional view on the line $dd$ of Fig. 3.
Figure 8:
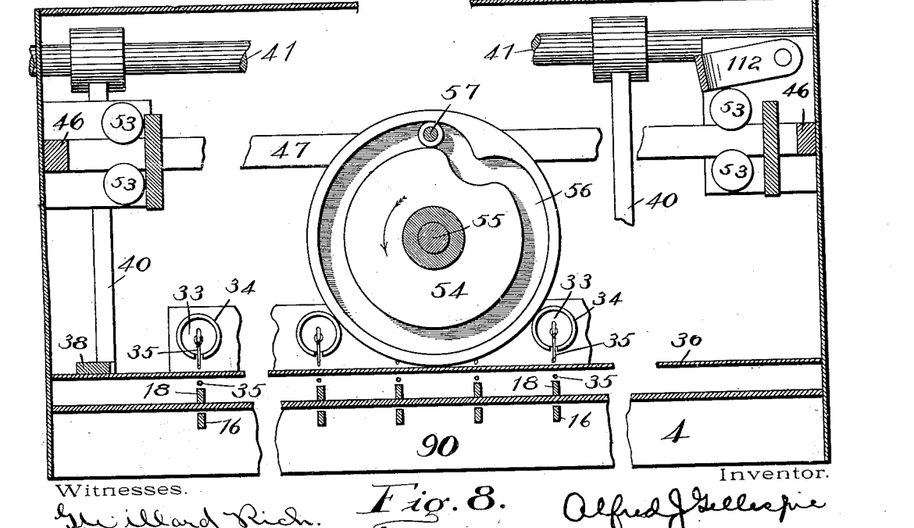
Fig. 8, a horizontal sectional view on the line $ee$ of Fig. 3.

The movable frame 25 is supported upon pins 43, journaled in the ends of said frame and in the depending arms 44 of the upper yoke-frame 45 and also on the pins 43× on the upwardly-extending arms 46 of the lower yoke-frame 47, as shown in Figs. 3 and 5. The upper frame 45 is supported upon headed studs 48 and 49, attached to brackets 50 51, said brackets being fastened rigidly to the sides of the main frame. The lower yoke 47 is supported upon brackets 52, fastened to the sides of the machine and having headed studs 53 thereon for limiting the rocking motion of said yoke-frame in the same manner that the studs 48 and 49 and the coöperating brackets limit the rocking movement of the upper yoke-frame. The devices just described constitute movable supports for the frame 25, and the back-and-forth movements are caused by cam-wheels 54, rigidly secured to a vertical shaft 55, one wheel being arranged above and the other below the frame 25 and each having on its proximate side a cam-track 56, in which operate rollers or projections 57, arranged on the upper and lower sides of the frame 25. The cam-tracks are for the greater portion of their length concentric with the shaft, but each has an inwardly-extending portion, as shown in Fig. 8, so that during the major portion of the rotation of the wheels the register-frame will be maintained at the rear of the casing; but at one point in the revolution said frame will be moved forward to actuate the registers and then quickly to the rear again to normal position.

For the purpose of preventing longitudinal movement of the register-frame when actuated by the cam I provide guide-links 112, pivoted to the register-frame and to the main frame of the machine, and also to insure the proper guidance of the register-frame as it moves back and forth I secure to its under side a plate 113, having a slot 114 for the passage of the shaft 55, as shown in Figs. 4 and 13.

Figure 11:
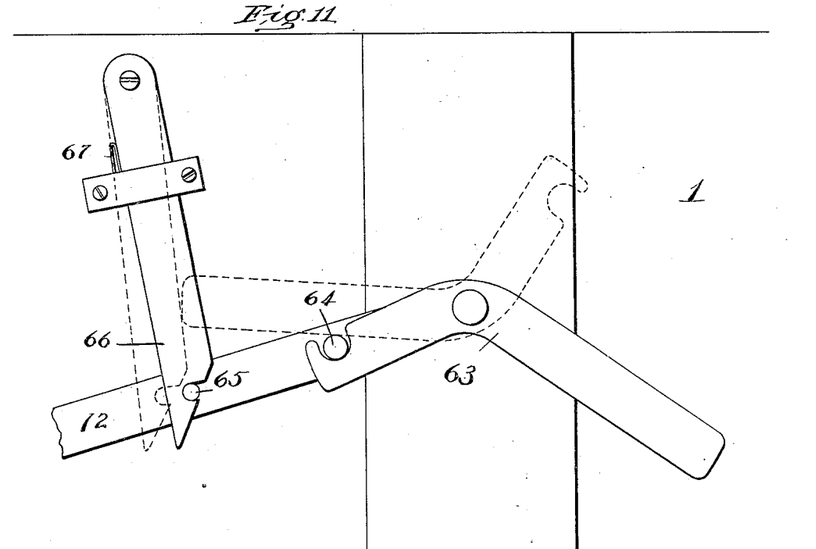
Fig. 11, an enlarged plan view of the curtain-lever-locking device.

The rotation of the shaft for causing the movement of the register-frame controls also the movement of the barrier or curtain arranged at the front of the machine for enveloping the voter and the indicating devices during the voting operation, and as it is desirable that one movement of an operating part cause the registration of the indicated ballots, the removal of the barrier or curtain, and the return of the operated indicators to normal position I preferably provide a single handle 62, by the oscillation of which all of these operations are accomplished in proper sequence. In the present construction the vertical shaft 55 is provided at its lower portion with a beveled gear 58, meshing with a corresponding gear 59, secured to a shaft 60, journaled in a bracket 61 and in the plate 36 and having at its outer end the operating-handle 62, preferably arranged beneath the ballot-plate and within the space inclosed by the curtain or barrier. The lever 12, by which the curtain is moved on the segmental guide 11, is loosely pivoted at its inner end upon the shaft 55, and rigidly connected to said shaft above the arm or lever 12 is a double arm 63, preferably slightly bent, as shown. This arm 63 is provided at one end with a slight recess adapted to coöperate with the pin 64 on the lever 12, and said lever is also provided with a catch-pin 65, arranged to coöperate with a recess in a pivoted latch 66, adapted to be actuated toward the shaft 55 by a spring 67 or other suitable device. When the front of the machine is covered by the curtain and the parts are ready for operation by the voter, the lever 12 is in the position shown in Fig. 9 and is retained by the latch 66, and the first movement of the shaft 55 (caused by the operation of the handle 62 rotating in the direction of the arrow in Fig. 8) will cause the forward movement of the register-frame and the actuation of the registers whose indicators have been operated. Then the frame will be returned to the rearward position and held by the concentric portion of the cam-tracks, and the continued rotation of the shaft will cause the longer arm of the lever 63 to move around to the position shown in dotted lines in Fig 11 and full lines in Fig.

Figure 9:
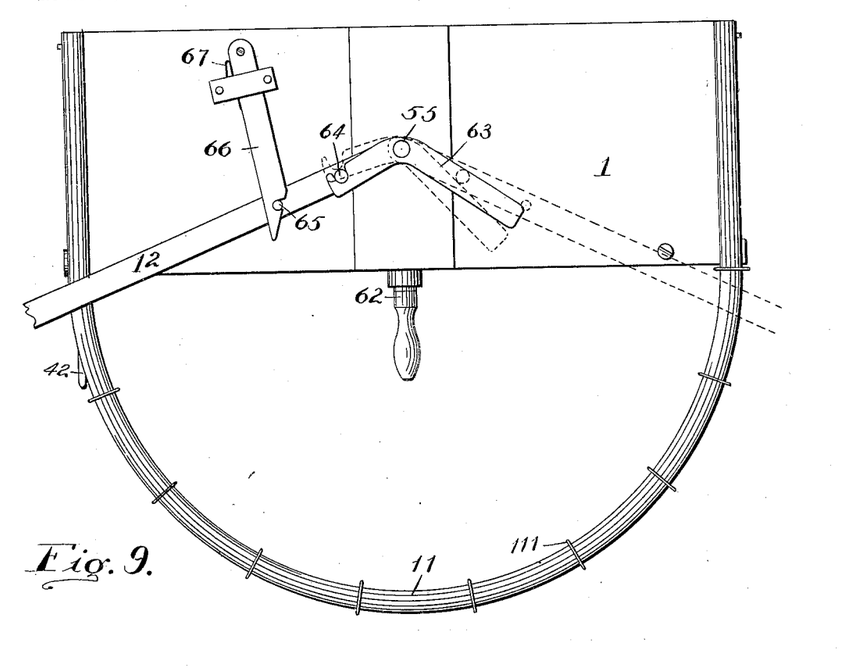
Fig. 9, a plan view of the machine, showing the curtain locking and operating lever.
Figure 12:
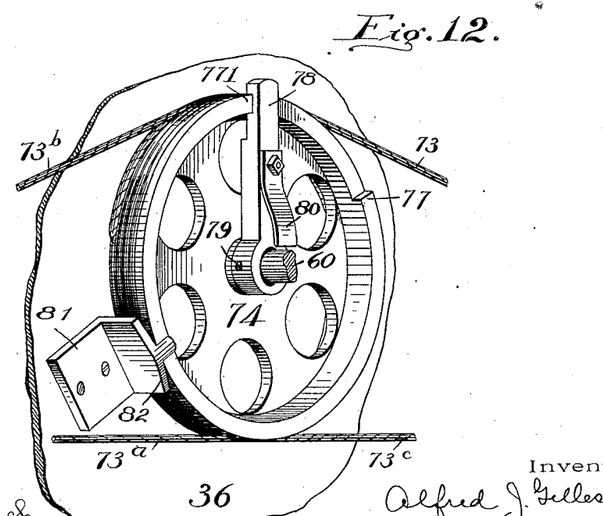
Fig. 12, a perspective view of the devices for actuating the resetting mechanism and operating the barrier or curtain.
Figure 17:
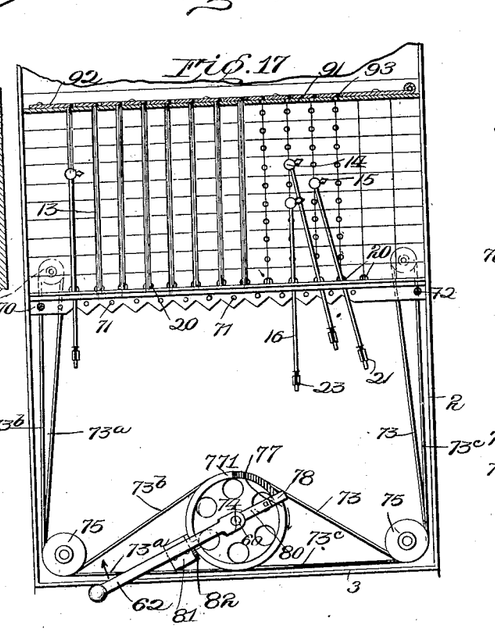
Figs. 17 to 20 are views showing the various positions assumed by the devices for restoring or resetting the indicators and operating the barrier or curtain. Figs. $17^a$ to $20^a$ are plan views of the curtain-operating devices, showing the position assumed by the parts when the indicator-operating devices are in the positions shown in Figs. 17 to 20.
Figure 17A:
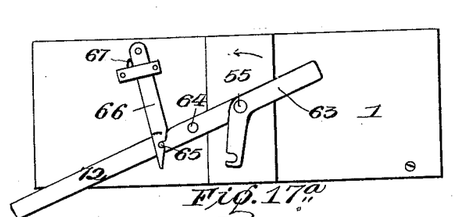
Figure 18:
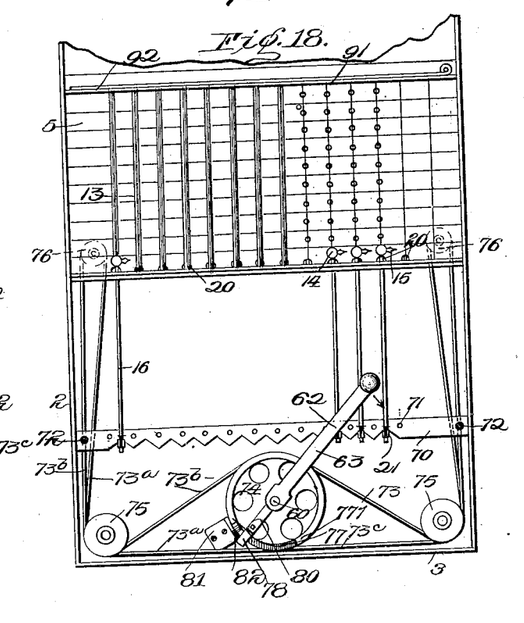
Figure 18A:
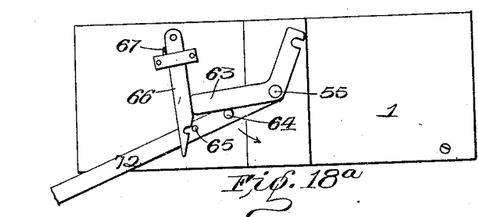
Figure 19:
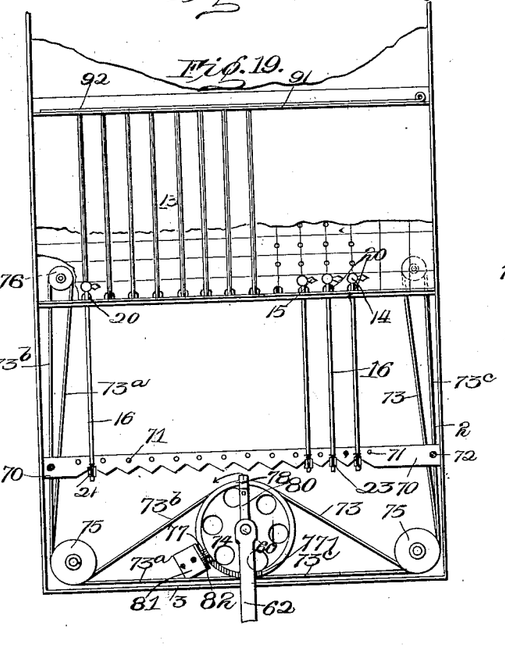
Figure 19A:
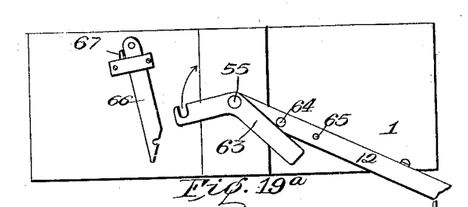
Figure 20:
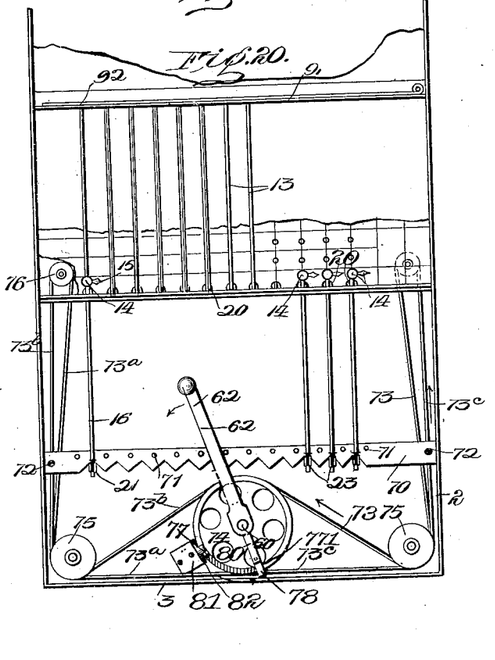
Figure 20A:
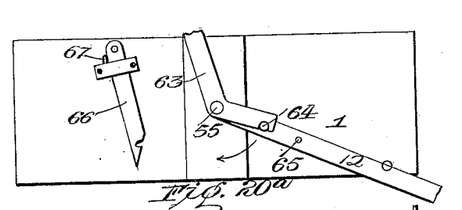

18ᵃ, disengaging the latch 66 and then engaging the pin 65 on the lever 12, carrying the latter with it around to the position shown in dotted lines in Fig. 9 and full lines in Fig. 19ᵃ, thereby removing the curtain from the front of the machine. After the backward-and-forward movements of the register-frame have been accomplished and before the curtain or barrier is removed from the front of the machine it is necessary that the indicators which have been operated by the voter be returned to normal position, and while any suitable device actuated mediately or immediately from the operating-shaft may be employed to accomplish this result I prefer the present construction, which provides a resetting-bar 70, arranged between the rods 16 and 18 of the ballot-indicators, having its under side provided with V-shaped notches, as shown, and adapted to engage with the connecting-pieces 21 at the lower ends of all said rods 16 and 18. This bar is also provided with pins 71, which center and prevent the improper operation of the rods 16 when used in the multicandidate group, as presently described, and the bar is connected at 72 by a screw or otherwise with cables or cords 73 73ᵃ 73ᵇ 73ᶜ, each of which is passed part way around a disk or drum 74, loose on the shaft 60, and the cables 73ᵃ and 73ᶜ extend horizontally in opposite directions from the lower side of said drum and around idler-pulleys 75, thence up and over pulleys 76 in rear of the ballot-support, thence downward, where they are connected to the resetting-bar 70. The cables 73 and 73ᵇ extend from the top of the drum in opposite directions and beneath idler-pulleys 75ᵃ, thence upward, and are connected to the bar 70. In practice and as shown the cables 73 and 73ᶜ are of one piece, their ends being connected to opposite sides of the drum and the intermediate portion connected to the bar, and the cables 73ᵃ and 73ᵇ are similarly arranged and connected. The construction is such that as the drum 74 is given a complete rotation in the direction of the arrows, Fig. 1, said resetting-bar will be carried down to its lowermost position to return all of the indicators, as shown in dotted lines, and then when the reverse rotation is given will be moved back to the position shown in full lines in Fig. 1. This operation of the resetting arrangement is timed with relation to the actuation of the registers and the removal of the curtain or barrier from the front of the machine so that after the registers are actuated both they and the indicators are returned to normal position before the curtain is operated at all, and while this may be accomplished in a variety of ways I prefer by suitable clutch devices to operate the cable-drum directly from the shaft carrying the operating-handle. The forward edge of the drum 74 is cut away, forming shoulders or stops 77 and 771 for the engagement of a latch 78, pivoted at 79 on the shaft 60 and adapted to be tilted in a plane at right angles to that of said shaft and to move into engagement with the shoulders on the drum by a spring 80, secured to the latch and operating against the rear side of the door or cover 6 when the latter is closed, as shown in Fig. 4, or against any other stationary surface. Arranged at the side of the drum is a bracket 81, having the inclined surfaces 82 just beyond the periphery of the drum and in position to engage the outer end of the latch 78 as the shaft is rotated, so that with the parts in the position shown in Figs. 1 and 12, the curtain being then over the front of the machine and the voter inside the curtain, when the handle is rotated in the direction of the arrow, Fig. 1, the shaft 60 will be rotated and the cam-wheels actuating the register-frame operated to move the latter forward and then back before the latch 78 engages the shoulder 77 on the drum, so that the registers will be operated, and then by the continued movement the latch 78 engages the shoulder 77 on the drum, as shown in Fig. 17, and rotates the latter until the outer end of said latch engages the incline or cam 82, as in Fig. 18, when it will be lifted from the shoulder 77, the drum then remaining stationary, with the resetting-bar in the position shown in dotted lines in Fig. 1 and in full lines in Fig. 18; but the handle is still rotated to the position shown in Fig. 19, the latch now riding freely upon the edge of the drum and not moving it. The movement of the handle from the point shown in Fig. 18, where the latch releases the drum, to the position in Fig. 19 causes the curtain-lever 12 to be moved from the position shown in Fig. 18ᵃ to that shown in Fig. 19ᵃ through the instrumentality of the arm 63, as previously described. This last-mentioned operation of removing the curtain from the front of the machine, it will be noted, is accomplished while the resetting-bar is in the position shown in dotted lines in Fig. 1 and full lines in Fig. 18 and holds the indicators locked and after the registers have been operated and returned to normal or rearward position. At the completion of the operation just described the handle comes to rest in the position shown in full lines in Figs. 1 and 19; but the curtain is then open and the other parts are in the position shown in dotted lines in Fig. 1 and full lines in Figs. 19 and 19ᵃ. When the handle is returned, moving backward in a direction opposite to that indicated by the arrow in Fig. 1 and in the direction of the arrows in Figs. 19 and 20, the latch moves around on the edge of the drum, this operation returning the curtain over the machine, and then said latch moves down into the notch between shoulders 77 and 771 and engaging the latter, as shown in Fig. 20, turns the drum around to the position in full lines in Fig. 1, lifting the resetting-bar by drawing the cables 73 73ᵃ, so that the voter inclosed by the curtain may operate the indicators.

Figure 1:
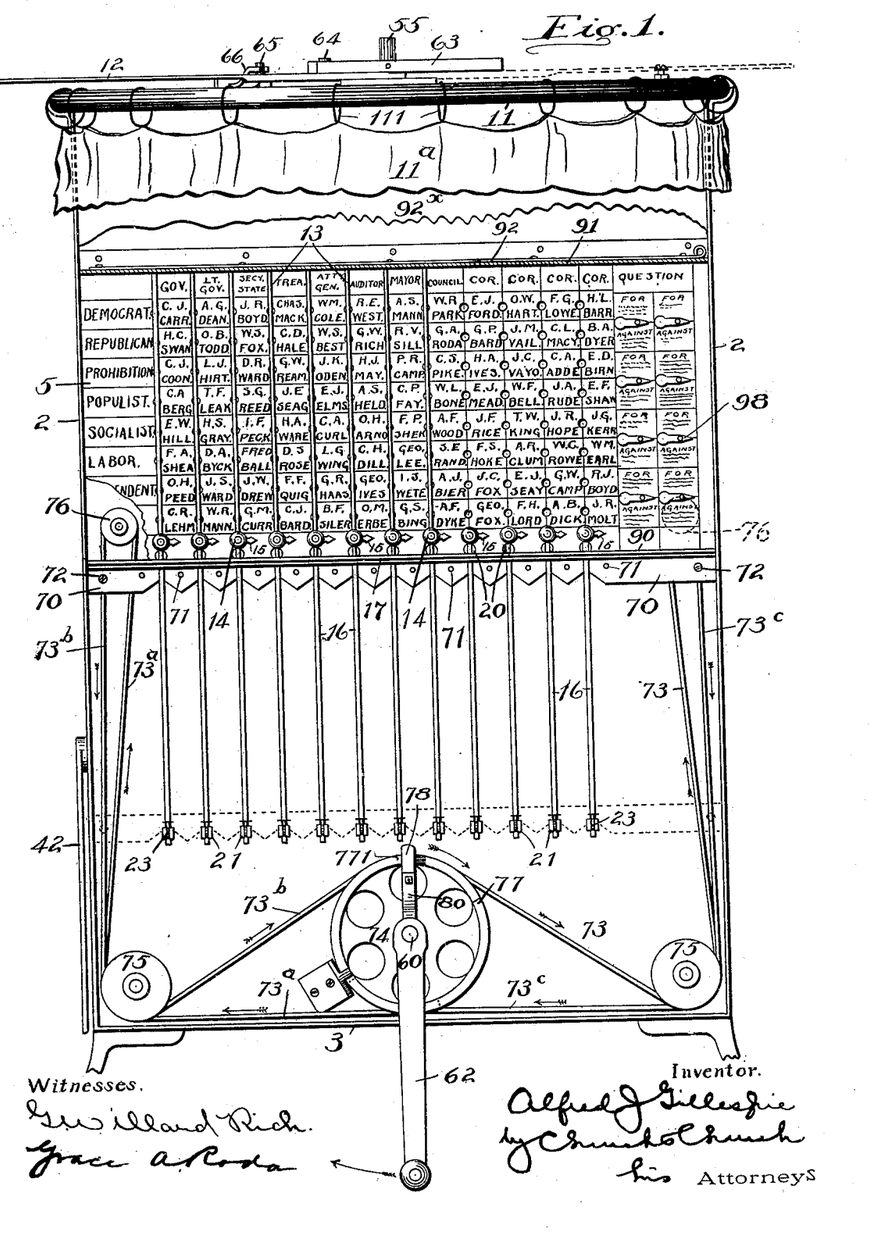
Figure 1 is a front view of a machine embodying my improvements with a portion of the front casing broken away to show the operation of the parts, the parts being shown in position for the operation by the voter.
Figure 21:
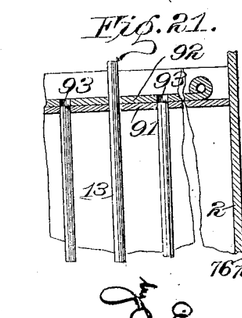
Fig. 21 is a detail sectional view showing the perforated locking-plate for the guide-rods 13.

In order to provide means for grouping the devices so that any number of candidates for the same office may be voted for and forming what is termed in the art a "multicandidate group," I make the guide-rods 13, on which the indicator-knobs 14 slide, removable—as, for instance, by passing them loosely through the plates 90 and 91—forming the upper and lower portion of the raised front of the machine, as shown in Fig. 4, the upper ends of said rods being confined by a plate 92, having perforations 93 corresponding to those in the plate 90 and adapted to be secured, when moved longitudinally with the apertures, out of register by any suitable locking means or to protect it from unauthorized operation by locating said plate 92 beneath the hinged door $92^{\times}$, as shown in Figs. 1, 2, and 21. When there are to be no groups formed in the machine—that is, when only one candidate is nominated by each of the parties for a particular office—the rods for each vertical office-line are secured as shown; but when desired to group two or more lines these rods are removed, and as the rods 16 pass through the slotted pins 20, which are capable of turning in their journals, the indicators, embodying the rods 16 and 18 and their connected parts, may be moved over into any of the other columns, as shown in Fig. 2, in which the four vertical lines devoted, say, to the office of coroner are shown grouped, and any of the indicators may be moved over the tickets or names, as shown, in which position they are held by their counterweights and the friction-springs 23 or other suitable devices. It will of course be understood that in using the group device the voter is permitted to indicate a vote for any of the persons whose names appear in the group, as by arranging the indicators as shown in Fig. 2, and that when the register-frame and indicators are moved relatively, as before described, only the registers whose actuators are engaged by the indicator-bosses 19 will be operated. By this means any or all of the indicators may be grouped and ballots can be indicated and counted to the number of the indicators free to move. The indicators in the multicandidate group are returned to normal position (shown in full lines in Fig. 1) by the operation of the resetting-bar 70, and the pins 71, arranged on said bar, serve to keep the indicators separated and prevent the projection or block 21 on the indicator from moving into any other V-shaped notch excepting the proper one—that is, they limit to some extent the lateral movement of the indicator-rods, as will be understood.

Figure 10:
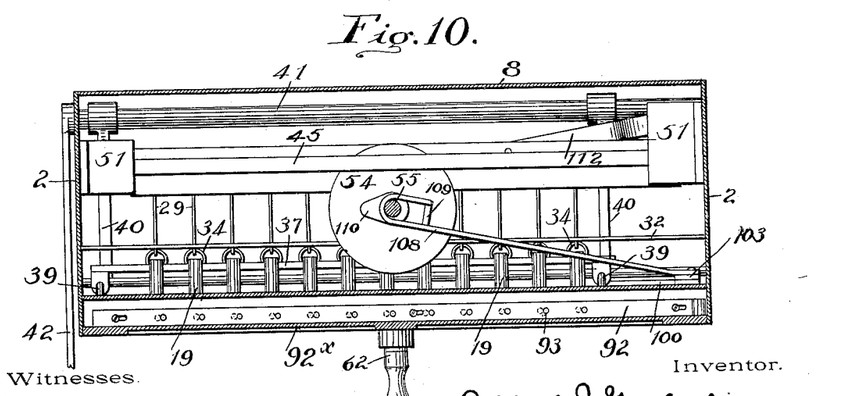
Fig. 10, a horizontal sectional view on the line $ff$ of Fig. 3.
Figure 16:
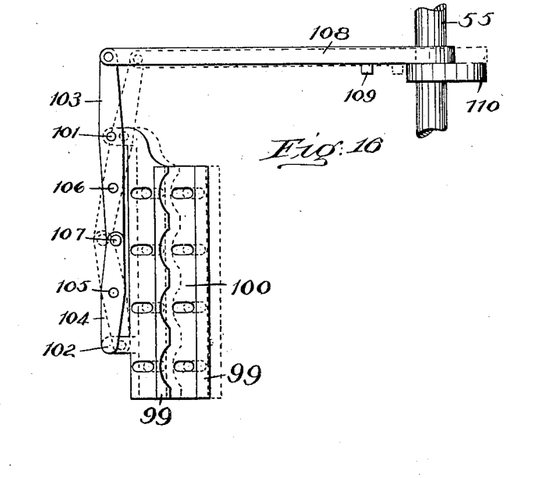
Fig. 16, a rear view of the questions-indicator-resetting devices detached from the other parts of the machine.

In order to adapt the machine for use in elections where questions of appropriations or other questions requiring an affirmative or negative vote is desired, I arrange on the rear side of the front plate and at one end thereof semicircular plates 95, each carrying two projections 96 and pivoted upon a stud 97, to which is connected a pointer 98 on the front of the ballot-support 4. The projections 96 are normally out of line with the actuators or slides 29 of the registers; but when the pointer is turned to indicate a vote for or against a proposition (shown in Fig. 2) one or the other of the projections is brought in line with its register-actuator, so that upon the relative movements of the register-frame and the indicators the register whose projection has been moved into line will be actuated. This device is not essentially different from the questions-voting device contained in my pending application, Serial No. 658,938, and I make no claim to it herein broadly. Each of the plates 95 is adapted to coöperate on its straight side with a resetting strip or plate 99, affixed to a movable plate 100, supported upon pivots 101 102 on levers 103 and 104, the last-mentioned lever being pivoted to the front plate or other portion of the main frame at 105 and the lever 103 being pivoted at 106, while the proximate ends of these levers are pivoted together at 107. (Shown particularly in Figs. 3 and 16.) The upper end of the lever 103 is connected to a link 108, having a loop extending around the shaft 55 and the projection 109 thereon adapted to be operated upon by a cam 110. (See Figs. 3, 10, and 16.) When any of the segmental plates 95 are operated, the plate 100 is moved to the right, Fig. 3, and the lever 103 is operated toward the center of the machine, in which position it remains until by the rotation of the shaft 55 the cam 110, operating through the projection 109 and link 108, moves the questions-plate 100 to the left, thereby resetting all the questions-indicators which have been operated.

The operation of the machine as a whole will now be understood. Assuming the curtain swung away from the front of the machine and leaving the front plate exposed, the lever 12 then being in the position shown in Figs. 1 and 9 in dotted lines and the indicators all locked in the lowermost position by the resetting-bar, as shown in dotted lines in Fig. 1, the voter goes up in front of the machine and grasping the handle 62 turns it in the direction opposite to that indicated by the arrow shown in Fig. 1, thereby moving the curtain around and causing the parts to assume the position shown in full lines in Fig. 1. He then raises the indicator-indices, arranging his ballot, as shown, for instance, in Fig. 2, operating the indicators in the multicandidate group to indicate his choice of candidates, and then grasping the handle 62 rotates it in the direction of the arrow in Fig. 1, which operation, as before described, causes the forward and backward movements of the register-frame to actuate the registers, resets the indicators which have been operated, and finally, through the means described, removes the curtain from the front of the machine, leaving the machine in position for the next voter.

While I prefer to employ the curtain operating on the segmental rod 11, as shown, as a means of preventing a view of the front of the machine, said device simply constitutes a barrier, and any other mechanism which will either prevent access to the indicators or cover the latter, or both, may be employed without departing from the spirit of my invention. The feature of having a single indicator for each row of candidates for the same office and of permitting the adjustment of the machine so that any of these indicators may be grouped is desirable in a machine of this kind, which has to be used for elections in which the candidates and groups of candidates must be varied. The guide-rods 13 are the only parts necessary to be manipulated when arranging the indicators in groups, excepting, of course, the placing of the tickets or placards upon the front plate and upon the corresponding registers in the rear.

It will be noted that the vertical lines of registers constitute a series, being all devoted to candidates for the same office, (excepting in the multicandidate group,) and that there is but one indicator for this series, although by reason of the lateral movement permitted the indicator when in the multicandidate group it may operate the register of any adjacent series.

The term "register" when used in the claims is to be taken in its broadest sense unless otherwise limited and includes any device for registering or recording a unit.

I have not deemed it necessary herein to show all of the registers, as they may be of any suitable construction and, as shown, are arranged in the channel-plates, which are removably connected with the register-frame.

The number of parts, considering the functions performed by the machine, is very small and they may be readily put together, and, furthermore, are not liable to get out of adjustment.

I do not claim herein, but do not wish to be understood as abandoning, the following features herein described: the construction of the registers, an arrangement of indicators and registers in a voting or registering machine in which a vote is first indicated and afterward registered, the construction and operation of the curtain or barrier on a segmental or curved guide, and positively-operated registers which are completely actuated by their bodily movement in opposite directions relative to a support on which indicators are mounted, as these and other broad features form the subjects-matter of other pending applications.

I claim as my invention—

1. In a voting-machine, the combination with a support and a plurality of series of registers thereon, of a plurality of ballot-indicators, one for each series of registers and each adapted to coöperate with a register in any adjacent series, and removable guides adapted when in place to guide each indicator so as to coöperate with one series of registers only, whereby the machine may be adapted for single or multi candidate group voting.

2. In a voting-machine, the combination with a support, and a plurality of series of registers thereon, each register being provided with an actuator, of a plurality of ballot-indicators, one for each series of registers and each having a part adapted to coöperate with the register-actuators in any adjacent series, and removable guides adapted when in place to guide each indicator so as to coöperate with one series of register-actuators only, whereby the machine may be adapted for single or multi candidate group voting.

3. In a voting-machine, the combination with a support and a plurality of series of registers thereon, of a plurality of ballot-indicators, one for each series of registers and each adapted to coöperate with a register in any series, removable guides adapted when in place to guide each indicator so as to coöperate with one series of registers only, and means for operating the register-support and the indicators relatively, to cause the simultaneous operation of the registers with which the indicators coöperate.

4. In a voting-machine, the combination with a support, a plurality of registers thereon, a plurality of ballot-indicators freely movable laterally and longitudinally and adapted to be placed in juxtaposition with any of the adjacent registers, and means for causing the relative movements of the registers and indicators to operate the registers with which the indicators are in operative relation.

5. In a voting-machine, the combination with a support and a plurality of series of registers thereon, of a plurality of freely-movable ballot-indicators forming part of the permanent structure, one for each series of registers, and each adapted to be placed in juxtaposition with the registers in any adjacent series, and means for causing the relative and simultaneous movements of the registers and indicators to operate the registers indicated.

6. In a voting-machine, the combination with a support, and a plurality of registers thereon, each having a register-actuator, of a plate or support for a ballot sheet or ticket, a plurality of ballot-indicators extending around the plate and having abutments on the side next the registers and indexes adapted to move over the front of the plate, and means for causing the relative movements of the indicators and registers to cause the actuation of the registers with which the abutments coöperate.

7. In a voting-machine, the combination with a support, and a plurality of series of registers thereon, each having an actuator, of a support or plate adapted to receive a ballot-sheet, a plurality of ballot-indicators, one for each series of registers and each having an index for coöperating with the ballot-sheet, and an abutment for coöperating with a register-actuator, removable guides for the indicators adapted when in place to cause the indicators to coöperate with a series of registers, and means for causing the operation of all the registers whose indicators have been adjusted.

8. In a voting-machine, the combination with a movable support, a series of registers thereon, each having an actuator in positive engagement therewith, a relatively-stationary plate engaging the actuators and operating them in one direction, of a plurality of adjustable ballot-indicators embodying an abutment normally out of but adapted to be projected into the path of any of the register-actuators of the series, means for causing the relative movements of the registers and the indicator-abutment to actuate the registers, and means for returning the indicator to normal position.

9. In a voting-machine, the combination with a register-frame, and a plurality of series of registers thereon, each having an actuator, of a plurality of ballot-indicators, one for each series and adapted to coöperate with the indicators in any series, removable guides for preventing the coöperation of the indicator with the registers of more than one series, means for causing the simultaneous operation of the registers in juxtaposition with the indicators, and devices for returning all the indicators to normal position out of operative relation with any of the indicators.

10. In a voting-machine, the combination with a series of registers, a ballot support or plate in front of the registers, and having the names of candidates thereon, of a ballot-indicator embodying an index extending over the front of the ballot-support, and an abutment adapted to coöperate with any of the registers in the series in the rear thereof, means for causing the relative movements of the abutment and registers to actuate the latter, and means for returning the indicator to normal position.

11. In a voting-machine, the combination with the ballot support or plate, the register-frame in rear thereof, and the registers thereon, of a ballot-indicator embodying the two rods one extending over the front plate and having an index, and one in rear thereof having an abutment adapted to coöperate with the registers, and a removable guide for said indicator.

12. In a voting-machine, the combination with the ballot support or plate, the register-support and the registers thereon, of a vertically and laterally movable counterweighted ballot-indicator adapted to be moved into operative relation with any of the registers.

13. In a voting-machine, the combination with the ballot support or plate, the register-support and the registers thereon, of a vertically and laterally movable counterweighted ballot-indicator movable over the ballot-support and having an abutment adapted to coöperate with the registers, and means for causing the relative movements of the register-support and indicator-abutment to cause the actuation of the register with which said abutment is in juxtaposition.

14. In a voting-machine, the combination with the ballot support or plate, the register-support, and a plurality of registers thereon, of a ballot-indicator having a portion extending over the ballot-support, and a portion adapted to coöperate with a single register, and means for yieldingly maintaining the indicators in adjusted position and in operative relation with a register.

15. In a voting-machine, the combination with the ballot support or plate, the register-support, and a plurality of registers thereon, of a counterweighted ballot-indicator having a portion extending over the ballot-support, and a portion adapted to coöperate with a single register, said indicator being freely movable laterally and longitudinally into juxtaposition with any of the registers, and means for returning the indicator to a position out of coöperative relation with any of the registers.

16. In a voting-machine, the combination with the ballot support or plate, the register-support, and a plurality of registers thereon, of the ballot-indicator having a portion coöperating with the ballot-support and a portion adapted to coöperate with a single register, a guide for the indicator permitting a longitudinal and swinging motion, and friction devices for maintaining the indicator in adjusted position.

17. In a voting-machine, the combination with the ballot support or plate, the register-support, and a plurality of registers thereon, of the ballot-indicator having a portion coöperating with the ballot-support, and a portion adapted to coöperate with a single register, a pivoted guide for the indicator, friction devices for maintaining the indicator in adjusted position, and means for operating the indicator longitudinally through the guide and out of coöperative relation with any of the registers.

18. In a voting-machine, the combination with the ballot-support, a plate, the register-support, and a plurality of series of registers thereon, a ballot-indicator for each series of registers, longitudinally and laterally movable and arranged to coöperate with the ballot-support and with a single register, removable guides for the indicators, and means for operating all the indicators simultaneously over the ballot-support.

19. In a voting-machine, the combination with a plurality of series of registers, of a plurality of ballot-indicators, one for each series, each indicator embodying a longitudinally and laterally movable rod, an index thereon, and a projection connected thereto and adapted to be moved into coöperative relation with a register, guides through which the indicator-rods pass, friction devices for holding the indicators in adjusted position, and a resetting-bar for moving all the indicators longitudinally through the guides.

20. In a voting-machine, the combination with a plurality of series of registers, of a plurality of ballot-indicators, one for each series, each indicator embodying a longitudinally and laterally movable rod, an index thereon, and a projection connected thereto and adapted to be moved into coöperative relation with a register, guides through which the indicating-rods pass, means for holding the rods in adjusted position, a resetting-bar for simultaneously operating the indicators in one direction, and a straight-ticket bar for operating all the indicators in the other direction.

21. In a voting-machine, the combination with a series of registers, and a ballot support or plate, of a ballot-indicator embodying a longitudinally and laterally swinging rod having an index, and a projection thereon adapted to coöperate with a register, and a resetting-bar having the centering-notches and the stop-pins between them.

22. In a voting-machine, the combination with a series of registers, and a ballot support or plate, in front of the registers, of a ballot-indicator embodying two rods, one in rear of the ballot-plate and having a projection for coöperating with the registers, and the other rod in front of the ballot-plate having an index, a detachable connection between the ends of the rods beyond the plate, and means for holding the indicator in any position of adjustment.

23. In a voting-machine, the combination with the ballot-plate, the register-frame, and a series of registers thereon, of a ballot-indicator embodying the rods on opposite sides of the plate and connected at their ends, the rod in front of the plate having the index, and the one in the rear thereof having the projection for coöperating with the registers, the counterweight connected to the indicator, and the guide for said counterweight.

24. In a voting-machine, substantially as described, a ballot plate or support, a ballot-indicator embodying the two rods having the recessed ends, and the detachable connecting-piece engaging said ends.

25. In a voting-machine substantially as described, a ballot plate or support, a ballot-indicator embodying the two rods connected at one end beyond the edge of the support, and the spring connected to one rod and engaging a stationary friction-surface.

26. In a voting-machine substantially as described, a ballot plate or support, a ballot-indicator embodying the two rods connected at one end beyond the edge of the support, a counterweight connected to the indicator, and a friction-spring carried by the indicator for engaging a stationary surface.

27. In a voting-machine, the combination with a plurality of movable ballot-indicators and registering devices controlled thereby, of a returning or resetting bar operating upon the indicators, an oscillatory drum and cables connecting it with the bar for operating the latter in opposite directions.

28. In a voting-machine, the combination with a plurality of independently-movable ballot-indicators, a plurality of registers controlled thereby, and a support for said registers, of a movable barrier for preventing access to the indicators, an oscillatory shaft, and means for causing the simultaneous relative movements of the indicators and registers at each oscillation, a resetting-bar for the indicators, the cables and drum therefor, the latch connection between the shaft and drum, and the arm on the oscillatory shaft actuating the barrier.

29. In a voting-machine, the combination with the independently-adjustable ballot-indicators, registers controlled thereby, and cam devices for causing the relative movements of the registers and indicators, of the resetting-bar for the indicators, the cables, and the drum therefor, an operating-handle for causing the operation of the cam devices, and a latch connection between said handle and the drum.

30. In a voting-machine, the combination with the adjustable ballot-indicators, the resetting-bar, and the cables connected thereto, of the drum having the shoulders, the stationary cam, and the operating-handle, and the latch carried by the handle and coöperating with the drum and cam.

31. In a voting-machine, the combination with the register-frame, and the registers thereon, of the ballot support or plate, the ballot-indicators coöperating with the ballot-support and also adapted to coöperate with the registers to cause the actuation of the latter, the removable guides for the indicators, and the movable locking-plate for securing said guides in position.

32. In a voting-machine, the combination with the register-frame, and a series of questions-registers thereon, a series of oscillatory questions-indicators, each having the two projections adapted to separately coöperate with their registers, the resetting-plate coöperating with said indicators to return them to normal position, the levers 103 and 104 pivoted together and to the plate, the link 108, and the rotary shaft having the cam coöperating with the link.

33. In a voting-machine, the combination with the ballot support or plate, a cover or barrier therefor, and the lever connected to said barrier, of the oscillatory shaft and the arm thereon having a loose connection with said lever and operating it in opposite directions during a portion of the oscillation of the shaft.

34. In a voting-machine, the combination with the ballot support or plate, a cover or barrier therefor, a lever connected to said barrier, and a catch for retaining said lever in one position, of the oscillatory shaft, the arm connected thereto and coöperating with the catch and also with opposite sides of the lever, whereby the barrier will be released and operated during a portion of the movement of the shaft in both directions, substantially as described.

35. In a voting-machine, the combination with the ballot support or plate, a cover or barrier therefor, and a lever connected to said barrier, of an oscillatory shaft and registering mechanism controlled thereby, a double arm on the shaft adapted to engage the barrier-lever on opposite sides to operate it in opposite directions during a portion of the movements of the shaft.

36. In a voting-machine, the combination with the casing, registering mechanism therein, and ballot-indicating devices controlling said mechanism and accessible from the front of the casing, of the curtain or barrier in front of the indicating devices, the lever 12, the oscillatory shaft 55, the double arm 63 engaging the lever and the catch 66.

37. In a voting-machine, the combination with a plurality of ballot-indicators, a plurality of registers, and a cover or barrier for preventing access to the indicators, of mechanism for operating the barrier or cover over and away from the indicators, mechanism for actuating the registers with which indicators have been left in voted position, a resetting device for the indicators, and an operating handle or arm connected to the mechanism for causing the actuation of the register and having a detachable connection with the cover and indicator-resetting devices, whereby both the latter are operated during a portion only of the movement of the handle or arm.

38. In a voting-machine, the combination with a plurality of registers, and a plurality of ballot-indicators adapted to coöperate with the registers when moved to voted position, said registers and indicators being relatively movable into coöperative relation, means for causing the simultaneous actuation of the registers with which indicators are left in voted position coöperate, and a barrier or cover for preventing access to the indicators, of an indicator-resetting device, a locking device for retaining the cover or barrier closed, and a movable operating arm or handle adapted, when moved in one direction, to first cause the relative movements of the voted indicators and registers, then to disengage the barrier-locking device, and then remove the barrier.

39. In a voting-machine, the combination with a plurality of registers, a corresponding plurality of independently-movable ballot-indicators adapted to coöperate with registers when moved to voted position, means for causing the simultaneous actuation of the registers that are in coöperative relation with indicators, a cover or barrier for the indicators, and an indicator-resetting device, of a movable operating arm or handle for causing the actuation of the registers with which voted indicators coöperate, a rotary wheel connected to the resetting device, a detachable connection between said operating-handle and the wheel, and a detachable connection between the arm and the barrier.

40. In a voting-machine, the combination with a register frame or support, a plurality of registers thereon, each embodying a toothed units-wheel, and a movable actuator having oppositely-arranged pallets for positively moving the wheel a portion of a revolution at each movement in one direction, of a support having stationary projections thereon adapted to engage the register-actuators, means for moving the supports relatively toward and from each other, and a movable ballot-indicator having an abutment for coöperating with the register-actuators to prevent their movement relative to the support having the projections.

ALFRED J. GILLESPIE.

Witnesses:
  J. E. GILLESPIE,
  H. V. McGREGOR.